Dec. 26, 1933.  J. P. WALKER ET AL  1,941,028
OIL AND GAS SEPARATOR
Filed May 15, 1931   3 Sheets-Sheet 1

Inventor
Jay P. Walker
Elmer R. Williams
By
Jack A. Schley
Attorney

Dec. 26, 1933.  J. P. WALKER ET AL  1,941,028
OIL AND GAS SEPARATOR
Filed May 15, 1931  3 Sheets-Sheet 3

Inventor
Joy P. Walker
Elmer R. Williams
By
Jack Ashley
Attorney

Patented Dec. 26, 1933

1,941,028

UNITED STATES PATENT OFFICE 1,941,028

OIL AND GAS SEPARATOR

Jay P. Walker and Elmer R. Williams, Tulsa, Okla., assignors to National Tank Company, Tulsa, Okla., a corporation of Oklahoma Application May 15, 1931. Serial No. 537,590

7 Claims. (Cl. 183—2.7)

This invention relates to new and useful improvements in oil and gas separators.

One object of the invention is to separate fluid such as gas from a liquid such as oil, by introducing them as an influent into an upright tank at such an elevation as to permit the gas to ascend and the liquid to descend and collect in the bottom of the tank, then to scrub the ascending gas so as to extract and collect the entrained liquids, then to conduct said extracted liquids to a separate container, then to introduce the collected liquids from the tank into said separate container and scrub them thus extracting contained gas therefrom and conduct this gas with any other gas rising from the oil in the separate tank, back to the scrubbing area of the tank, then carrying off the gas from the tank, and finally carrying of the liquid from the separate container.

Another object of the invention is to separate gas and oil and to discharge the oil with less gas than is at present in the oil going to the stock tanks from separators now in common use.

An important object of the invention is to conduct the oil from the baffles of a separator into a separate chamber through a drain pipe and to mix said drained oil with the oil collected in the tank, but to protect the drain pipe discharge from the gas pressure in the tank outside of the baffles; whereby differences in the gas pressures inside of and outside of the baffles will not force oil from the tank up through the drain pipe and into the baffles in the path of the gas passing therethrough.

A further object is to discharge the oil from the tank in a more quiescent state.

Another object of the invention is to provide an oil and gas separator particularly adapted to handle an influent containing sand, particularly in quantities.

A construction designed to carry out the invention will be hereinafter described together with other features of the invention.

Figures 1, 2:
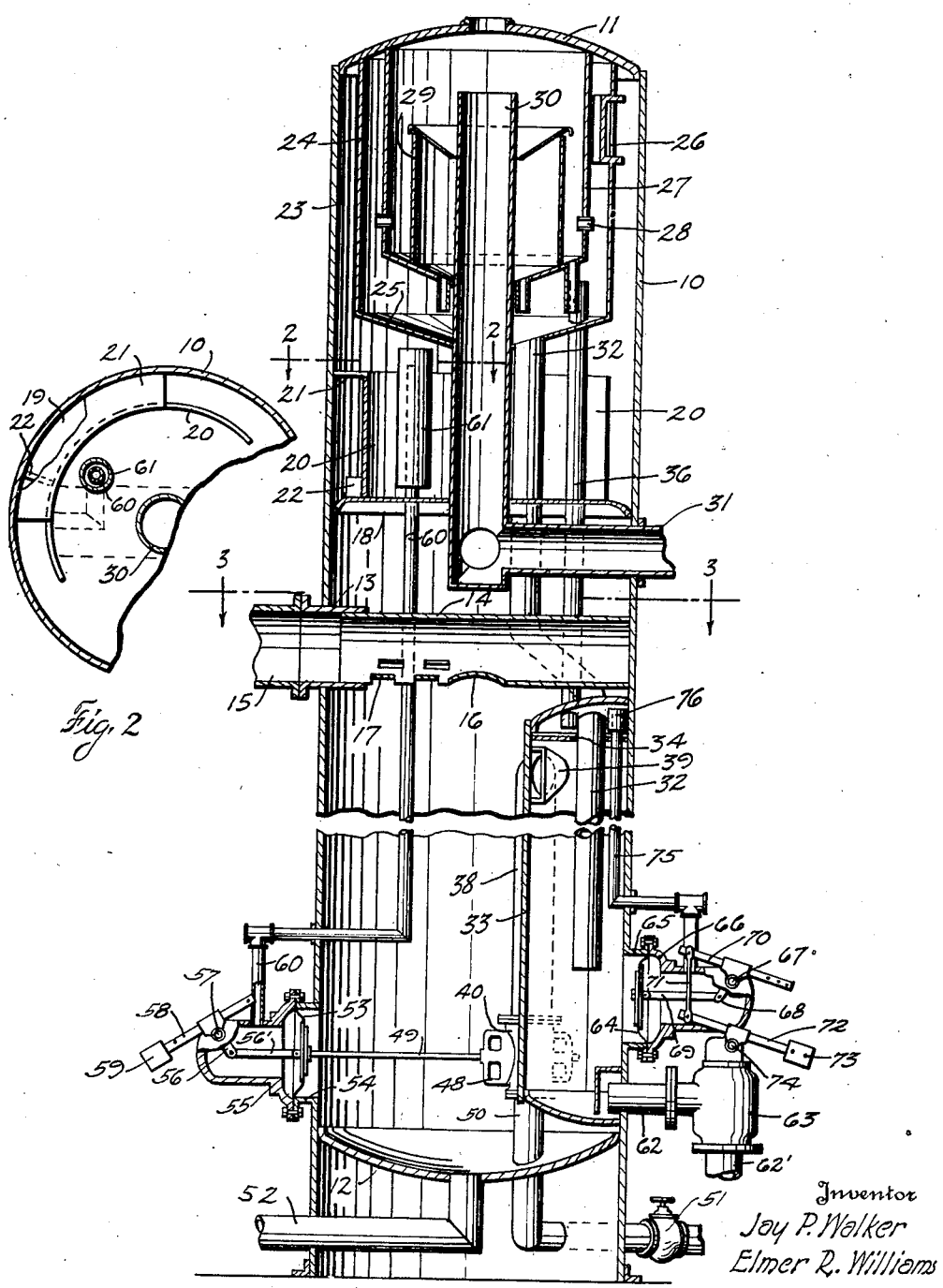
Figure 3:
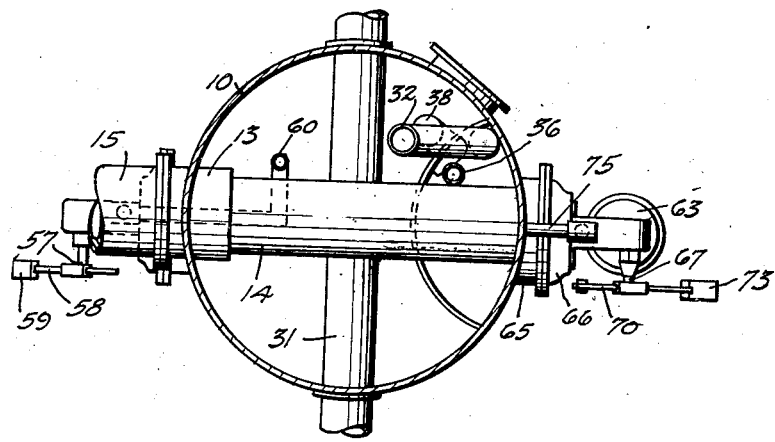
Figure 4:
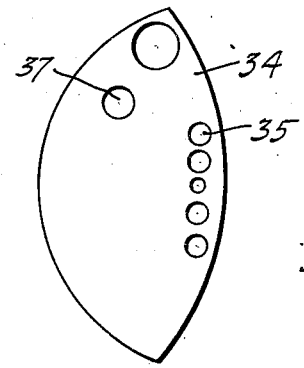
Figure 5:
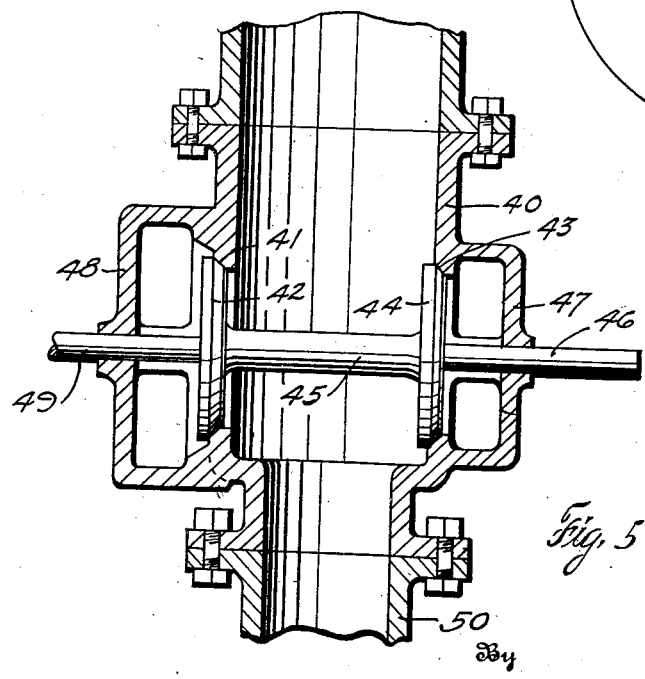
Figure 6:
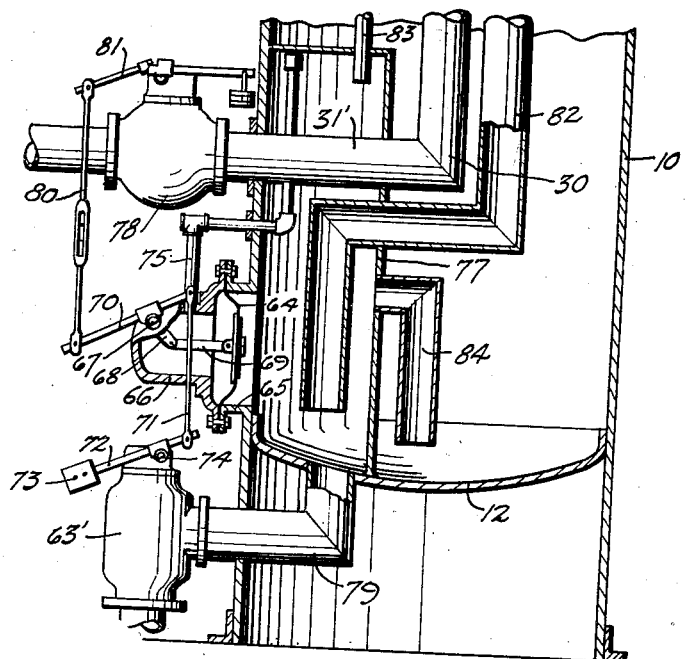
Figure 7:
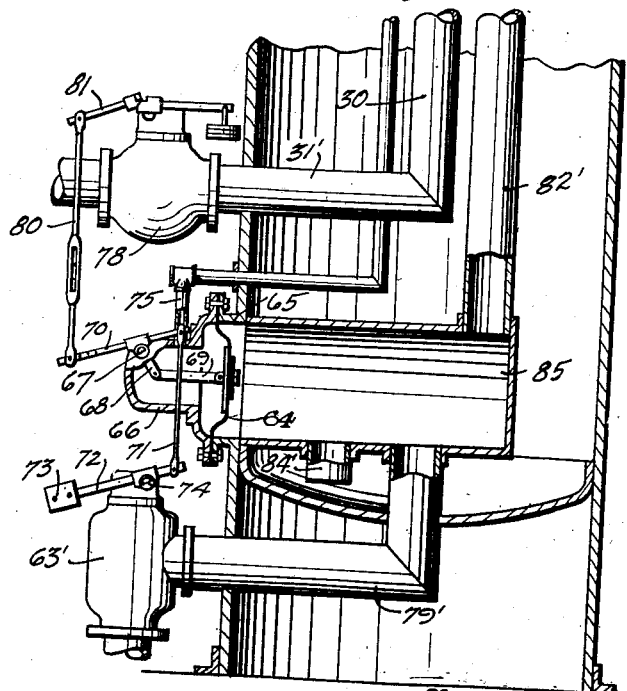

The invention will be more readily understood from a reading of the following specification and by reference to the accompanying drawings in which an example of the invention is shown, and wherein:

Fig. 1 is a vertical sectional view of a separator constructed in accordance with the invention, Fig. 2 is a horizontal cross-sectional view taken on the line 2—2 of Fig. 1, Fig. 3 is a horizontal cross-sectional view taken on the line 3—3 of Fig. 1, Fig. 4 is a plan view of the separate chamber baffle, Fig. 5 is a vertical sectional view of the inlet valve, Fig. 6 is a partial vertical sectional view of another form of the invention, and Fig. 7 is a partial vertical sectional view of still another form.

In the drawings the numeral 10 designates an upright metal tank having a crowned top 11 and a concaved false bottom, 12. At or near mid-height of the tank is arranged a flanged inlet collar 13 projecting into the tank. A transverse tubular nozzle 14 has one end telescoped into said collar and the diametrical opposite end secured to and sealed against the inner wall of the tank. An inlet pipe 15 (from the well) is secured to the flange of the collar.

The nozzle at or near its central portion has an enlarged discharge opening 16 in its underside and between this opening and the collar is provided with a plurality of slots or openings 17. The influent or flow from the well compressing an admixture of oil and gas and containing more or less sand, enters the nozzle from the pipe 15. The oil, gas and sand will be discharged downwardly through the openings 16 and 17. The closed end of the nozzle between the opening 16 and the tank wall, will form a cushion chamber and the gases will be compressed therein, thus absorbing some of the shock incident to the checking and discharging the influent from the nozzle.

The gases and lighter vaporous constituents will rise and flow upwardly on each side of the nozzle while the oil and sand will collect in the bottom portion of the tank. A horizontal partition or baffle 18 shuts off the upper portion of the tank from the nozzle. The outer edge portion of the partition is curved downwardly and a curved slot or inlet opening 19 is formed in this curved portion contiguous to the wall of the tank. An upright curved baffle 20 is fastened on the partition contiguous to the inner curved edge of the slot. A curved deflector plate 21 fastened on the upper edge of the baffle 20 extends to the wall of the tank (Figs. 1 and 2) and overhangs the slot. An upright deflector 22 at one end of the slot tends to direct the gases arising through said slot toward the opposite end of the deflector plate which extends beyond the opposite end of said slot. The slot 19 extends from the deflector 22 to a point under the opposite end of the plate 21.

The rising gases can only escape upwardly through the slot 19 and are induced to take a circumferential path by the deflector 22 and the baffle 20 so as to scrub out liquids against the upright walls of the tank 10 and the baffle 20. It is obvious that the gas and gaseous vapors will pursue a helical path and thus enter an annular vertical scrubbing chamber 23 formed between the wall of the tank and a cylindrical shell 24 hanging from the top 11. This shell has an inclined bottom 25 which tends to deflect the gaseous fluids into said chamber.

The shell has one or more louvres 26 near its upper end and the gaseous fluids upon entering are caused to whirl. A cylindrical baffle 27 is mounted concentrically in the shell and has inlet tubes 28 extending through its wall. A cylindrical deflector 29 is mounted within the baffle 27 on the bottom thereof. An axial gas escape flue 30 extends down from near the top 11 through the bottom of the baffle 27, shell 24 and partition 18. No claim is made to the details of the baffle and deflector structures because they are substantially the same as is shown in the re-issue Letters Patent of Jay P. Walker, issued February 24, 1931, No. 17,983, and further because any suitable baffling and scrubbing arrangement may be installed above the nozzle 14.

A plurality of branch pipes 31 lead from the lower end of the gas flue 30 and these are connected to different conductors (not shown) for conveying the gas to desired points. Any branch pipe not used may be plugged. The manner of handling the discharged gas is not a part of this invention.

Liquid or oil which is extracted by the scrubbing within the shell 24 and against the baffle 27 and deflector 29 will be collected in the bottom 25 of the shell. A large drain pipe 32 leads from the bottom 25 down through the partition 18 and through the top of separate container or upright chamber 33 mounted on the inner side of the wall of the tank so as to enclose a portion of said wall. The pipe extends well down into the chamber and the latter extends from just below the nozzle 14 to near the bottom 12.

Adjacent the top of the chamber 33 is mounted a horizontal baffle plate 34 (Fig. 4) having vent holes 35. The pipe 32 passes through this plate. A vent pipe 36 extends from the bottom of the shell through the top of the chamber and terminates over an aperture 37 in the plate 34 (Fig. 4). Owing to the pressure drop in the shell there will be a difference in pressure between the gas pressure in the tank 10 and the gas pressure in the shell. The gas pressure in the shell has been found to be five pounds less in some instances and more or less in other instances. The vent pipe 36 will equalize the gas pressure in the shell and in the chamber and will permit gas collected in the chamber to escape up into the shell.

Within the tank and adjacent the chamber I mount an upright pipe 38 and connect the upper end of this pipe to a diverter 39 fastened on the inner side of the curved wall of the chamber 33. This diverter is of such shape as to abruptly turn the oil and spread it in fan shape on the inner surface of said wall, whereby it will follow and run down said curved wall thus scrubbing out such gas as may be contained in the oil.

The lower end of the pipe 38 is fastened to the top of a valve case 40 (Fig. 5) which has a vertical valve seat 41 on one side receiving a valve 42 and a smaller valve seat 43 on the diametrical opposite side receiving a valve 44. These valves are integrally connected by a shank 45. A cage 47 surrounds the seat 43 and a guide stem 46 is mounted to slide in said cage. A cage 48 also surrounds the seat 41 and forms a guide for a valve operating rod or pitman 49. When the valves are opened oil from the tank 10 may enter through the cages and seats into the case 40. Owing to the pressure differences the oil will be forced up the pipe 48 and discharged into the chamber 33 through the diverter 39.

A reduced drain pipe 50 leads from the bottom of the case 40 through the bottom 12 and includes a gate valve 51 opened only when it is desired to clean out the pipe 38 or to drain oil from the tank. For carrying off the sand and extraneous matter a pipe 52 is connected with the bottom 12 of the tank. This pipe is equipped with a suitable valve (not shown).

For operating the valves 42 and 44 a flexible diaphragm 53 is fastened on a flanged man hole 54 open to the tank and secured by a hooded cover 55. A rock shaft 57 is journaled in the cover and has a crank arm 56 connected to the outer side of the diaphragm by a link 56'. A lever 58 is fastened on the shaft outside of the cover and carries a counter weight 59. A gas pressure equalizing pipe 60 extends from the hood of the cover into the tank and up through the partition 18 and has a cap 61 on its upper end.

When the liquid or oil in the tank builds up to a level where its weight is sufficient to overcome the leverage of the counter weight 59, the diaphragm 53 will be forced outward by the weight of the oil, thus pulling the rod 49 and opening the valves 42 and 44. This will permit oil from the tank to be forced into the valve case 40, up through the pipe 38 and discharged from the diverter 39 onto the inner surface of the wall of the chamber 33. When the oil level in the tank 10 has been lowered to the proper level the counter weight 59 will restore the diaphragm and close the valves 42 and 44. It is pointed out that the valves could be operated by other means, floats being common in this art.

When the influent is discharged from the nozzle 14 the falling oil and sand will more or less agitate the oil collected in the bottom of the tank. This oil will contain considerable gas and ordinarily such contained or entrained gas would pass out of the tanks with the oil to the stock tanks. By conducting the oil from the tank into the chamber 33 and scrubbing it on the inner side of the curved wall of said chamber the oil globules are broken up and the contained gas is thus liberated. This gas is carried off through the pipe 36 to the baffles.

When the oil from the diverter 39 and the drain pipe 32 reaches a predetermined level in the chamber it is discharged therefrom through an outlet pipe 62 at the bottom of said chamber. It is pointed out that not only will the oil accumulating in the chamber be freed of much gas, but it will be much more quiescent than oil stored in the tank 10.

For periodically dumping or discharging oil from the chamber 33 an outlet valve 63 of the type common in this art is connected to the pipe 62 and in turn is connected to the pipe 62' leading to the stock tanks. The valve is operated by a diaphragm 64 similar to the diaphragm 53. A man hole 65 open to the chamber receives the diaphragm 64 which is secured by a hooded cover 66. A rock shaft 67 is journaled in the hood by the cover and has a crank arm 68 connected to the outer side of the diaphragm by a link 69. A lever 70 is attached to the shaft 67 and the inner end of said lever is pivoted to the upper end of link 71. The link 71 has its lower end pivoted to the inner end of a lever 72, which carries a counterweight 73 on its outer end. This lever is fastened on the rock shaft 74 of the valve 63.

It is obvious that when the oil level in the chamber 33 rises to the proper height the diaphragm 64 will be displaced outwardly and the valve 63 thus opened. To equalize the gas pressure an equalizing pipe 75 leads from the hooded cover 66 into the chamber and up through the baffle plate 34. A protecting cap 76 is mounted on the upper end of the pipe 75. Any other means for operating the valve 63 may be employed.

Another form of the invention is shown in Fig. 6. Only the lower portion of the tank 10 is shown, but it is to be understood that the upper portion is the same as Fig. 1, and duplicate illustration is not considered necessary to those skilled in the art. A chamber 77 similar to the chamber 33 is provided and a gas pipe 31' is connected to the gas flue 30. A suitable gas valve 78 is connected to the gas pipe.

An oil discharge pipe 79 leads from the bottom of the chamber through the tank bottom 12. An oil outlet valve 63' like the valve 63 is connected to the pipe 79. The diaphragm 64 and its associated parts are used and these have been designated by the same reference numerals. For operating the gas valve 78 a link 80 is connected with the lever and this link is pivoted to the operating arm 81 of said valve. The arm 81 is connected to the rock shaft of the gas valve so as to undergo a certain amount of lost motion before operating the shaft, as is fully set forth in the co-pending application Serial No. 537,559, filed May 15, 1931. This mechanism forms no part of the present invention.

A large drain 82 extends from the shell bottom 25 to the chamber 77 and is extended therein to the bottom portion. A vent pipe 83 extends from the top of the chamber to the bottom 25 the same as the pipe 36. A goose neck pipe 84, simulating the pipe 38 enters the chamber 77. This pipe is less in diameter than the drain pipe 82. Oil will flow from the tank 10 into the chamber and when it reaches the proper height in said chamber and in the pipe 82, the diaphragm 64 will be displaced and the valve 63' opened. Owing to the larger size of the pipe 82 oil will flow out of it in greater quantities when the valve 63' is open than will enter the chamber through the pipe 84 and thus oil cannot back up into the baffles.

Fig. 7 illustrates another form somewhat similar to Fig. 6 except that chamber 85 is disposed horizontally instead of vertically and open at one end to the diaphragm 64. The drain pipe 82' is connected to the top of the chamber and may also be used as a gas vent pipe. The chamber has an inlet 84' in its bottom open to the tank. The oil discharge pipe 79' leads from the bottom of the tank. The inlet is less in diameter than either the drain pipe 82' or the discharge pipe 79' and this oil will flow out of the chamber faster than it will flow in.

Various changes in the size and shape of the different parts, as well as modifications and alterations, may be made within the scope of the appended claims.

Having illustrated and described preferred forms of the invention, what we claim, is:

1. In an oil and gas separator, an upright tank having an influent inlet and a gas outlet, baffles in the upper portion of the tank, a separate chamber in the lower portion of the tank, a conductor for carrying the extracted oil from the baffles to the separate chamber, means for admitting collected oil from the bottom of the tank into the separate chamber, and an outlet for all the oil leading from the chamber.

2. An oil and gas separator as set forth in claim 1, and means actuated by the liquid in the chamber for controlling the discharge of oil through the outlet.

3. In an oil and gas separator, an upright tank having an influent inlet and a gas outlet, baffles in the upper portion of the tank, a separate chamber in the bottom of the tank, an oil discharge pipe leading from the tank to the chamber, a valve connected to said oil discharge pipe, means actuated by the liquid in the tank for operating said valve, a drain pipe leading from said baffles to the chamber, and means for discharging oil from the chamber.

4. An oil and gas separator as set forth in claim 3, and a diverter in the upper portion of the chamber receiving oil from the discharge pipe and spreading it upon the inner surface of the chamber.

5. In an oil and gas separator, an upright tank having an influent inlet and a gas outlet, baffles in the upper portion of the tank, an oil collecting chamber at the bottom of the tank receiving oil from the inlet, a separate oil receptacle in the tank having an inlet from the oil chamber, and a drain pipe leading from the baffles to the oil receptacle.

6. In an oil and gas separator, an upright tank having a gas outlet, a horizontal influent nozzle adjacent mid-height of the tank extending across said tank, said nozzle having one end closed to form an influent cushion, baffles above the nozzle, a separate chamber in the tank below the nozzle, a drain pipe leading from the baffles to the chamber, an outlet for the chamber, and a conductor for conveying oil collected in the bottom of the tank into the separate chamber.

7. In an oil and gas separator, an upright tank having a gas outlet, a horizontal influent nozzle adjacent mid-height of the tank extending across said tank, said nozzle having one end closed to form an influent cushion, baffles above the nozzle, a separate chamber in the tank below the nozzle, a drain pipe leading from the baffles to the chamber, an outlet for the chamber, a conductor for conveying oil collected in the bottom of the tank into the separate chamber, and a valve for opening and closing the conductor.

JAY P. WALKER.
ELMER R. WILLIAMS.